United States Patent
Koskinen (10) Patent No.: US 10,574,399 B2
(45) Date of Patent: Feb. 25, 2020

(54) ACKNOWLEDGEMENT OF A RANGE OF SEQUENCE NUMBERS

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/115,287

(22) PCT Filed: Jan. 31, 2014

(86) PCT No.: PCT/EP2014/051915
§ 371 (c)(1),
(2) Date: Jul. 29, 2016

(87) PCT Pub. No.: WO2015/113625
PCT Pub. Date: Aug. 6, 2015

(65) Prior Publication Data
US 2017/0244520 A1    Aug. 24, 2017

(51) Int. Cl.
*H04W 4/00* (2018.01)
*H04L 1/16* (2006.01)
*H04L 1/18* (2006.01)

(52) U.S. Cl.
CPC .......... *H04L 1/1621* (2013.01); *H04L 1/1848* (2013.01)

(58) Field of Classification Search
CPC .................................................. H04L 1/1621
See application file for complete search history.

(56) References Cited

U.S. PATENT DOCUMENTS

| | | | |
|---|---|---|---|
| 5,754,754 A | 5/1998 | Dudley et al. | 395/182.16 |
| 6,088,342 A * | 7/2000 | Cheng | H04L 1/08 370/320 |
| 6,629,261 B1 * | 9/2003 | Chintada | H04L 1/1621 375/346 |
| 6,950,961 B2 * | 9/2005 | Krause | G07C 15/00 714/4.5 |
| 7,046,642 B1 | 5/2006 | Cheng et al. | 370/320 |

(Continued)

FOREIGN PATENT DOCUMENTS

| | | |
|---|---|---|
| CN | 101227483 A | 7/2008 |
| CN | 101785250 A | 7/2010 |

(Continued)

OTHER PUBLICATIONS

ETSI MCC R2-133044; Report of 3GPP TSG RAN WG2 meeting #82, held in Fukuoka, Japan, May 20-24, 2013.

(Continued)

*Primary Examiner* — Guang W Li
(74) *Attorney, Agent, or Firm* — Harrington & Smith (57) ABSTRACT

Group acknowledgement of a range of consecutive sequence numbers associated with non-received data. The acknowledgement includes indication of at least one endpoint of the range. It can include, for example, the sequence numbers of the first and last non-received data or the last received data packet. The feedback can refer also to a single sequence number, relating to a single PDU. The triggering of the acknowledgement can be done by conventional gap detection or receiver timers.

18 Claims, 6 Drawing Sheets

(56) References Cited

U.S. PATENT DOCUMENTS

| | | | | |
|---|---|---|---|---|
| 7,139,829 | B2* | 11/2006 | Wenzel | H04L 12/66 709/232 |
| 7,283,531 | B2* | 10/2007 | Torri | H04L 29/06 370/394 |
| 7,672,241 | B2* | 3/2010 | Foore | H04W 28/08 370/235 |
| 9,294,235 | B2* | 3/2016 | Zhang | H04L 1/1848 |
| 9,838,158 | B2* | 12/2017 | Yi | H04L 1/08 |
| 9,860,797 | B2* | 1/2018 | Basu Mallick | H04L 1/1614 |
| 9,936,515 | B2* | 4/2018 | Fujishiro | H04W 72/085 |
| 2002/0004842 | A1* | 1/2002 | Ghose | H04L 1/1809 709/235 |
| 2003/0007480 | A1* | 1/2003 | Kim | H04L 1/1812 370/349 |
| 2008/0151881 | A1* | 6/2008 | Liu | H04L 1/0002 370/389 |
| 2009/0034476 | A1* | 2/2009 | Wang | H04W 28/06 370/331 |
| 2009/0047986 | A1* | 2/2009 | Chen | H04L 41/082 455/522 |
| 2011/0164589 | A1* | 7/2011 | Lee | H04W 36/02 370/331 |
| 2011/0317642 | A1* | 12/2011 | Eravelli | H04L 1/1887 370/329 |
| 2013/0148620 | A1* | 6/2013 | Nanri | H04W 74/006 370/329 |
| 2015/0133122 | A1* | 5/2015 | Chen | H04W 36/04 455/436 |
| 2015/0223282 | A1* | 8/2015 | Vajapeyam | H04W 76/18 370/221 |
| 2015/0319801 | A1* | 11/2015 | Lee | H04W 56/00 370/329 |
| 2016/0013892 | A1* | 1/2016 | Suzuki | H04L 1/1621 370/328 |
| 2016/0127243 | A1* | 5/2016 | Hwang | H04L 47/323 370/235 |
| 2016/0134404 | A1* | 5/2016 | Sarkar | H04L 1/1621 370/329 |
| 2016/0135103 | A1* | 5/2016 | Lee | H04W 28/08 455/444 |
| 2016/0315868 | A1* | 10/2016 | Zhang | H04L 47/34 |
| 2017/0195996 | A1* | 7/2017 | Fujishiro | H04W 76/10 |

FOREIGN PATENT DOCUMENTS

| | | |
|---|---|---|
| JP | H10341488 A | 12/1998 |
| JP | 2005328131 A | 11/2005 |
| WO | WO-2015046957 A1 * | 4/2015 ............ H04W 36/08 |

OTHER PUBLICATIONS

3GPP TSG-RAN WG2 Meeting #83bis, Ljubljana, Slovenia, Oct. 7-11, 2013, R2-133091, "Bottom-line gains of protocol-stack option 3D over 3C", NSN, Nokia Corporation, 3 pgs.

3GPP TSG-RAN WG2 Meeting #84, San Francisco, USA, Nov. 11-15, 2013, R2-133873, "Assumptions to base reordering at PDCP", NSN, Nokia Corporation, 3 pgs.

3GPP TSG-RAN WG2 Meeting #84, San Francisco, USA, Nov. 11-15, 2013, R2-133972, "PDCP Reordering Operation for the Alternative 3C", Huawei, HiSilicon, 3 pgs.

3GPP TSG-RAN Meeting#58, Barcelona, Spain, Dec. 4-7, 2012, RP-122033, "New Study Item Description: Small Cell enhancements for E-UTRA and E-UTRAN-Higher-layer aspects", NTT Docomo, Inc., 5 pgs.

3GPP TR 36.842 V0.4.0 (Oct. 2013), "$3^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 52 pgs.

3GPP TS 29.281 V11.6.0 (Mar. 2013), "$3^{rd}$ Generation Partnership Project; Technical Specification Group Core Network and Terminals; General Packet Radio System (GPRS) Tunnelling Protocol User Plane (GTPv1-U) (Release 11)", 27 pgs.

3 GPP TS 36.423 V12.0.0 (Dec. 2013), "$3^{rd}$ Generation Partnership Project; Technical Specification Group Radio Access Network; Evolved Universal Terrestrial Radio Access Network (E-UTRAN); X2 application protocol (X2AP) (Release 12)", 144 pgs.

3GPP TS 36.424 V11.0.0 (Sep. 2012), "$3^{rd}$ Generation Partnership Project; Technical Specification Group Radio Access Network; Evolved Universal Terrestrial Radio Access Network (E-UTRAN); X2 data transport (Release 11)", 8 pgs.

* cited by examiner

ACKNOWLEDGEMENT OF A RANGE OF SEQUENCE NUMBERS

The present invention relates to a method, apparatus and computer program for transmission of data.

BACKGROUND

A communication system can be seen as a facility that enables communication sessions between two or more entities such as fixed or mobile communication devices, base stations, servers and/or other communication nodes. A communication system, and compatible communicating entities, typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station or an access point and/or another user equipment. The communication device may access a carrier provided by a station, for example a base station or an access node, and transmit and/or receive communications on the carrier.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can comprise different types of radio service areas providing transmission/reception points for the users. For example, in LTE-Advanced the transmission/reception points can comprise wide area network nodes such as a macro eNode-B (eNB) which may, for example, provide coverage for an entire cell or similar radio service area. Network nodes can also be small or local radio service area network nodes, for example Home eNBs (HeNB), pico eNodeBs (pico-eNB), or femto nodes. Some applications utilise radio remote heads (RRH) that are connected to for example an eNB. The smaller radio service areas can be located wholly or partially within the larger radio service area. A user equipment may thus be located within, and thus communicate with, more than one radio service area. The nodes of the smaller radio service areas may be configured to support local offload. The local nodes can also, for example, be configured to extend the range of a cell.

SUMMARY

In a first aspect there is provided a method comprising: determining, at a first node, that an event has occurred; in response to said determination sending, to a second node, an indication of at least one endpoint of a range of sequence numbers associated with non-received data.

Preferably said event comprises determination that data has not been received at said first node from said second node.

Preferably said event comprises determination that data has not been received at said first node from said second node for a pre-determined time.

Preferably said event comprises expiration of a timer.

Preferably said range comprises a continuous range.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said first node comprises a secondary base station, and said second node comprises a master base station.

Preferably said method comprises receiving said non-received data.

In a second aspect there is provided a computer program comprising computer executable instructions which when run on one or more processors perform the method of the first aspect.

In a third aspect there is provided a method comprising: receiving, at a first node, an indication of at least one endpoint of a range of sequence numbers associated with non-received data at a second node; using said at least one endpoint to determine said range of sequence numbers associated with non-received data; comparing said range of sequence numbers with at least one sequence number associated with data previously sent by said first node to said second node; and where there is a match, re-sending data associated with those matching sequence numbers.

Preferably said re-sent data is sent to one or more of said second node and a user equipment.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said range of sequence numbers comprises a continuous range.

Preferably said first node comprises a master base station, and said second node comprises a secondary base station.

In a fourth aspect there is provided a computer program comprising computer executable instructions which when run on one or more processors perform the method of the third aspect.

In a fifth aspect there is provided an apparatus comprising at least one processor; and at least one memory including computer program code; the at least one memory and the computer program code configured to, with the at least one processor, cause the apparatus at least to: determine that an event has occurred; in response to said determination send, to a node, an indication of at least one endpoint of a range of sequence numbers associated with non-received data.

Preferably said event comprises determining that data has not been received at said apparatus from said node.

Preferably said event comprises determining that data has not been received at said apparatus from said node for a pre-determined time.

Preferably said event comprises expiration of a timer.

Preferably said range comprises a continuous range.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said apparatus comprises a secondary base station, and said node comprises a master base station.

Preferably said apparatus is configured to receive said non-received data.

In a sixth aspect there is provided an apparatus comprising means for determining that an event has occurred; and means for sending to a node, in response to said determination, an indication of at least one endpoint of a range of sequence numbers associated with non-received data.

Preferably said event comprises determining that data has not been received at said apparatus from said node.

Preferably said event comprises determining that data has not been received at said apparatus from said node for a pre-determined time.

Preferably said event comprises expiration of a timer.

Preferably said range comprises a continuous range.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said apparatus comprises a secondary base station, and said node comprises a master base station.

Preferably said apparatus is configured to receive said non-received data.

In a seventh aspect there is provided an apparatus comprising at least one processor; and at least one memory including computer program code; the at least one memory and the computer program code configured to, with the at least one processor, cause the apparatus at least to: receive an indication of at least one endpoint of a range of sequence numbers associated with non-received data at a node; use said at least one endpoint to determine said range of sequence numbers associated with non-received data; compare said range of sequence numbers with at least one sequence number associated with data previously sent by said apparatus to said node; and where there is a match, re-send data associated with those matching sequence numbers.

Preferably said re-sent data is sent to one or more of said node and a user equipment.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said range of sequence numbers comprises a continuous range.

Preferably said apparatus comprises a master base station, and said node comprises a secondary base station.

In an eighth aspect there is provided an apparatus comprising means for receiving an indication of at least one endpoint of a range of sequence numbers associated with non-received data at a node; means for using said at least one endpoint to determine said range of sequence numbers associated with non-received data; means for comparing said range of sequence numbers with at least one sequence number associated with data previously sent by said apparatus to said node; and where there is a match, means for re-sending data associated with those matching sequence numbers.

Preferably said re-sent data is sent to one or more of said node and a user equipment.

Preferably said at least one endpoint comprises at least one of a sequence number associated with successfully received data; a sequence number associated with non-received data; a sequence number associated with last-received data; a sequence number associated with first-received data.

Preferably said data comprises at least one protocol data unit.

Preferably said endpoint comprises at least one of an upper endpoint and a lower endpoint.

Preferably said range of sequence numbers comprises a continuous range.

Preferably said apparatus comprises a master base station, and said node comprises a secondary base station.

BRIEF DESCRIPTION OF FIGURES

Some embodiments will now be described by way of example only with reference to the accompanying figures in which.

SPECIFIC DESCRIPTION

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 and 2 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
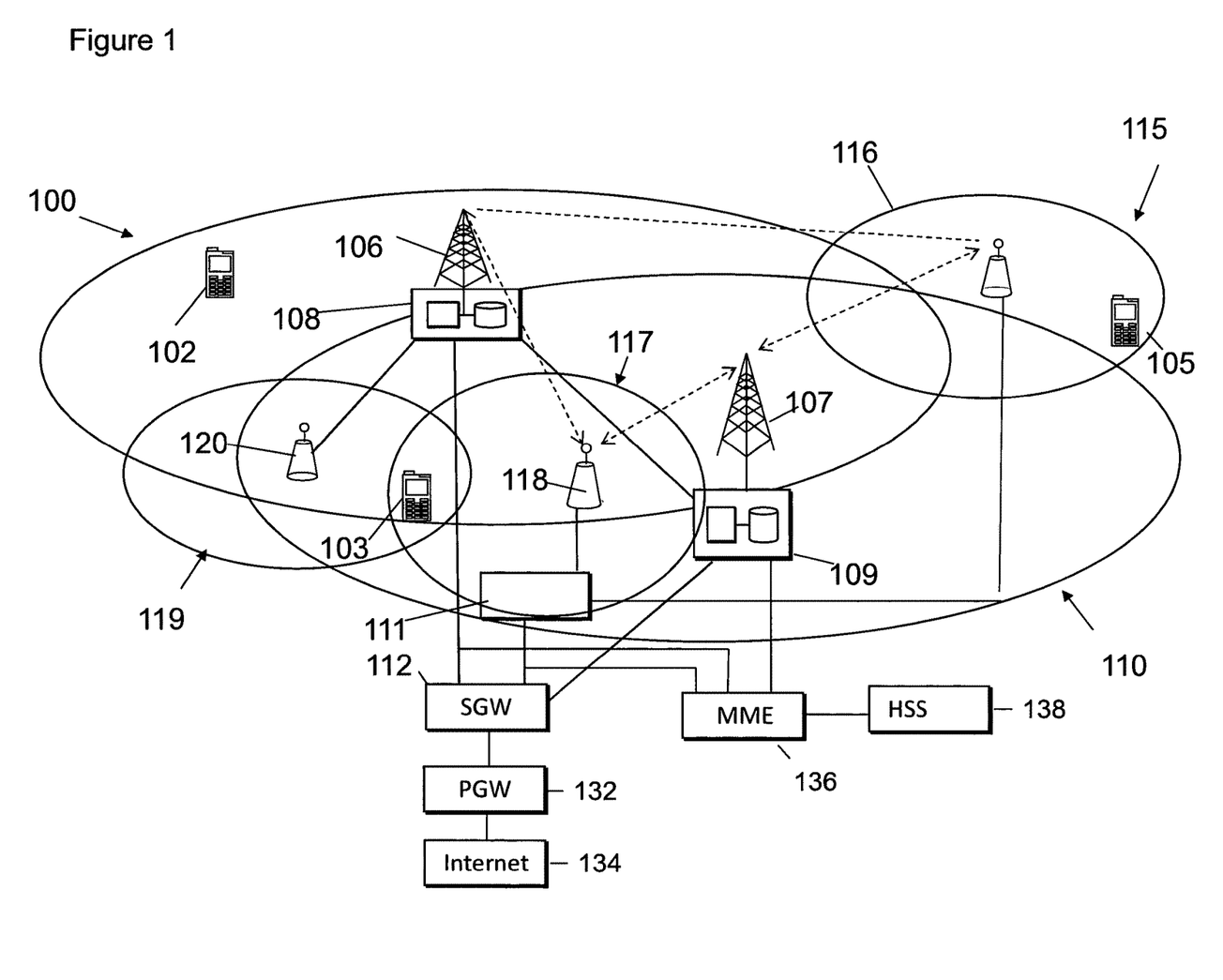
FIG. 1 shows a schematic diagram of a network according to some embodiments.
Figure 3:
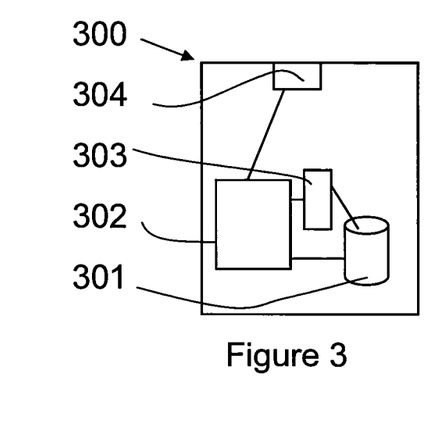
FIG. 3 shows a schematic diagram of a control apparatus according to some embodiments.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. The control apparatus may be as shown in FIG. 3 which is discussed later.

In FIG. 1 stations 106 and 107 are shown as connected to a serving gateway (SGW) 112. The smaller stations 116, 118 and 120 are connected to a further gateway function 111 which is connected to the S-GW 112. In some embodiments, the further gateway function 111 is omitted. The S-GW 112 may be connected to, for example, the internet 134 via a PGW (PDN (packet data network) gateway) 132.

The base stations are also connected to a MME 136 (mobility management entity) which in turn is connected to a HSS (home subscriber server) 138.

Figure 2:
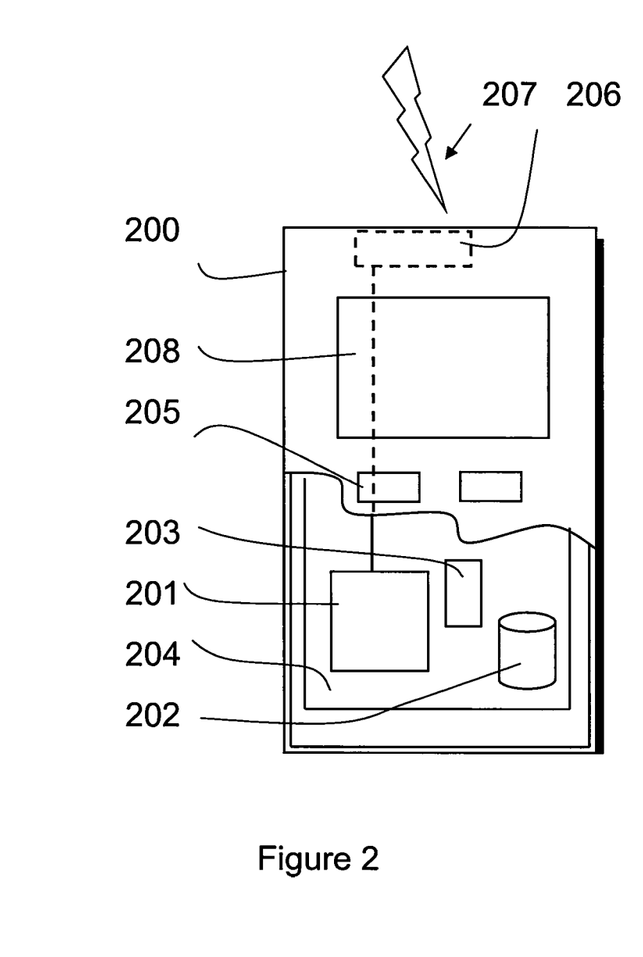
FIG. 2 shows a schematic diagram of a mobile communication device according to some embodiments.

A possible mobile communication device for transmitting and retransmitting information blocks towards the stations of the system will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with Tx antenna numbers or port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus. The control apparatus 300 can be configured to provide control functions. For this purpose the control apparatus 300 comprises at least one memory 301, at least one data processing unit (or processor or microprocessor) 302, 303 and an input/output interface 304. The control apparatus 300 can be configured to execute an appropriate software code to provide the control functions.

The control apparatus may be provided in a base station. In that case, via the interface the control apparatus may be coupled to a receiver and a transmitter. The receiver and/or transmitter may be part of a base station. That is the apparatus may comprise means for receiving and means for sending/transmitting.

The control apparatus may alternatively or additionally be provided elsewhere in the system, for example in the S-GW.

Although FIG. 3 shows one memory 301 and two processors 302 and 303, any number of these components may be provided. Multiple functions may be carried out in a single processor, or separate functions may be carried out by separate processors. For example a single processor may be used to make multiple determinations, or separate determinations may be made by separate processors.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Figure 4:
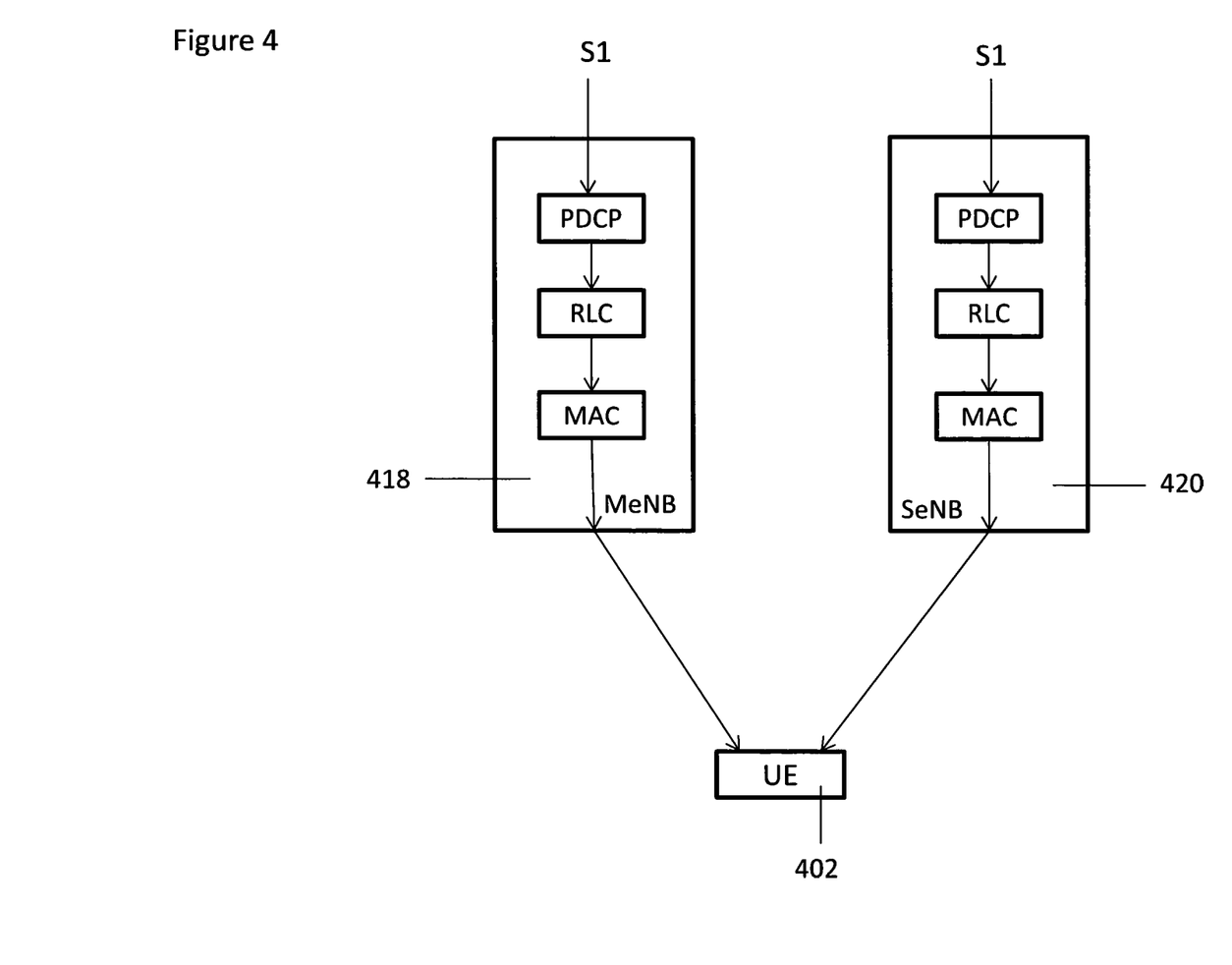
FIG. 4 shows a first example of a UE connected to two base stations.

Reference is made to FIG. 4 which shows a first arrangement. In this arrangement, a user equipment UE 402 is arranged to receive communications from two eNode Bs. The communication is carried out via bearers that are established between the UE and S-GW, with the eNB handling the routing of traffic between the S-GW and UE. In this example, the first eNode B is referred to as a MeNode B 418 (the master eNode B). In some embodiments, the master eNode B 418 is the eNode B which terminates at least the S1-MME for a given UE and may act as a mobility anchor towards the core network. The MeNB may always have at least one bearer setup—this may be mandatory since the SRBs (signalling radio bearers) always go to MeNB, in some systems. However, DRBs (data radio bearer) may all be offloaded to SeNB.

The second eNode B is the SeNode B 420 (secondary eNode B) which provides additional radio resources for the user equipment 402 and which is not the master eNode B.

In some embodiments, dual connectivity is provided where a given user equipment 402 consumes radio resources provided by at least two different network points (e.g. the master and secondary eNode Bs).

Each of the Node Bs in FIG. 4 comprises a PDCP (packet data convergence protocol layer), an RLC (radio link control) layer and a MAC (medium access control) layer.

In the arrangement of FIG. 4, also the secondary eNode B 420 terminates S1-U interface for the UE in question, and there are independent PDCP layers in the two base stations. Thus, in some embodiments there may be no bearer split. With this arrangement, there may be no need for the master eNode B to buffer or process packets for an EPS (evolved packet system) bearer transmitted by the secondary eNode B.

Thus the arrangement of FIG. 4 entails a UE being simultaneously served by two eNode Bs, with each eNode B serving their own separate EPS bearers of the UE, such that the nearest network-side aggregation point for all the EPS bearers of the UE is the Serving gateway i.e. outside E-UTRAN (evolved UMTS (universal mobile telecommunications system) terrestrial radio access network.

There may be no need to route traffic to the master eNode B which means that there are low requirements for the backhaul link between the two base stations and there may be no requirement for flow control.

The arrangement shown in FIG. 4 may support local break-out and content caching at the secondary eNode B in a straightforward manner.

Figure 5:
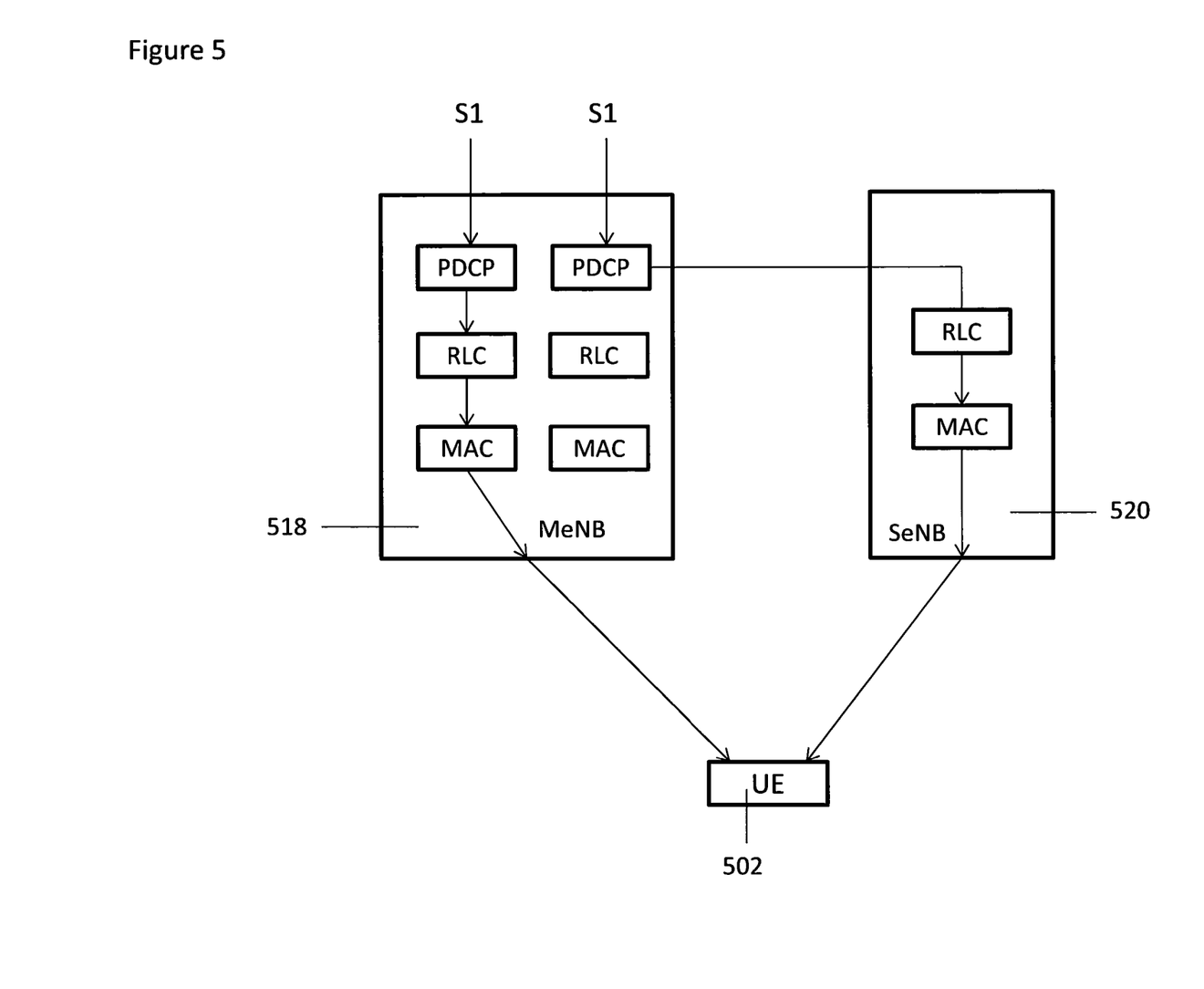
FIG. 5 shows a second example of a UE connected to two base stations.

Reference is made to FIG. 5 which shows an alternative arrangement to that shown in FIG. 4. In this embodiment, only the master eNode B 518 terminates S1-U interface for the UE in question. There is, however, a bearer split in the master eNode B 518 (also a non-split bearer is shown for completeness). However, both of the base stations have independent RLC layers for a split bearer. Thus, in the arrangement shown in FIG. 5, the data stream for a split-bearer is received at the master eNode B 518. One part of the stream is passed by the RLC and MAC layers to the user equipment 502, and the other part is passed by a back haul connection between the master eNode B and secondary eNode B 520 to the RLC layer of the secondary eNode B 520. This may be on the X2 interface. In some embodiments only a subset of PDCP PDUs (protocol data units) are forwarded from the MeNB 518 to the SeNB 520. The stream then passes through the MAC layer of the secondary eNode B to the user equipment UE.

This arrangement makes the PDCP responsible for reordering the PDUs received from the RLCs associated with the different eNode Bs. It has been proposed that this is to be based upon a re-ordering timer. A possible disadavantage to this is that the re-ordering timer at PDCP needs to have a long expiry value, implying that the PDCP at the UE may at times need to buffer a lot of received data before delivering it to a higher layer.

It has also been recognised by the inventors of the present application that a disadvantage with this mechanism is that packets intended for the UE via the SeNB may be lost in transit between the MeNB and the SeNB over the X2 interface. Failure to address such packet loss may result in a relatively long time interval where no data is delivered to a higher level within the UE, such as the Transport Control Protocol (TCP) layer. This may consequently have an adverse effect on TCP performance.

In light of this, one option would be to make the X2 data transport "lossless" by introducing ACK/NACK control messages, as well as possibly adding a polling mechanism. This could be in the form of a PDU header field requesting acknowledgement of reception of that PDU with GTP-U tunnelling protocol. However, this may cause either duplicated transmission buffer (one for PDCP SDUs, and another for GTP-U PDUs), or an ability for the GTP-U entity to map a received NACK to the relevant PDCP PDU and indicate that NACK up to the PDCP.

In some embodiments X2 packet losses between MeNB and SeNB in the FIG. 5 arrangement may be avoided, or at least mitigated, by the use of ACK/NACK feedback sent by the SeNB and addressed to the MeNB. The ACK/NACK feedback may be directly addressed to the PDCP layer at the MeNB. Since the MeNB may send only a subset of PDCP PDUs and their respective sequence numbers (SNs) via the SeNB, then the SeNB may not necessarily always know which PDUs it was intended to receive in the first place. Accordingly the inventors of the present application have identified that a somewhat indirect form of NACK indication may be required.

In an embodiment, when the SeNB detects that it has not received expected data, it informs the MeNB as such. The data may be PDUs expected to have been received from the PDCP layer of the MeNB. The received data, and/or data expected to have been received, will be associated with one or more sequence numbers. That is each expected PDU will have an associated sequence number (SN). When a certain event trigger occurs (explained in more detail below) which indicates to the SeNB that an expected PDU has not been received, then the SeNB can inform the MeNB of the SNs for which no associated PDU has been received. This could be a single SN relating to a single PDU. Alternatively there may be more than one PDU which hasn't been received, in which case the SeNB can inform the MeNB of the plurality of non-received PDUs by providing the MeNB with the associated plurality of SNs. Where it has been detected that the SeNB has failed to receive a range of PDUs, then the SeNB can provide the MeNB with an associated SN range. This range may be continuous. In some embodiments the SeNB may provide the MeNB with the first and last SN of that range, and an indicator that it is a range. Where a range is indicated, the SN endpoints may be one or more of:
  (i) the SN of a (successfully) received (PDCP) PDU;
  (ii) the SN of a (PDCP) PDU not received (i.e. no definitive indication of the reception status of first SN outside the range);
  (iii) no end, i.e. beyond certain SN no PDU has been received.
  (iv) an SN of first received data.

For a newly established bearer, the first PDU that an SeNB receives may, for example, have an SN other than 0. If, for example, the SN of a first-received PDU is "5", then the SeNB may infer that is has not received PDUs having SNs 1 to 4.

The trigger for sending the indication may, for example, be a determination that no (PDCP) PDUs have been received for a certain time. This time may be predetermined. The time may also be varied for different implementations. In response to such a detection, the SN indication may be sent to the MeNB. Other triggers may also be used. For example a gap in the PDU SNs of the lower layer protocol over which these PDUs are received may be spotted. For example, the SN field in the GTP-U header may be used, so that the SeNB may identify a packet loss by spotting a gap in GTP-U SNs.

Once the MeNB has received such an indication, it may compare the received SN number or SN range with the (PDCP) PDU SNs sent to the SeNB. By this comparison the MeNB can detect which PDUs failed to reach the SeNB, and select those PDUs for retransmission.

Figure 6:
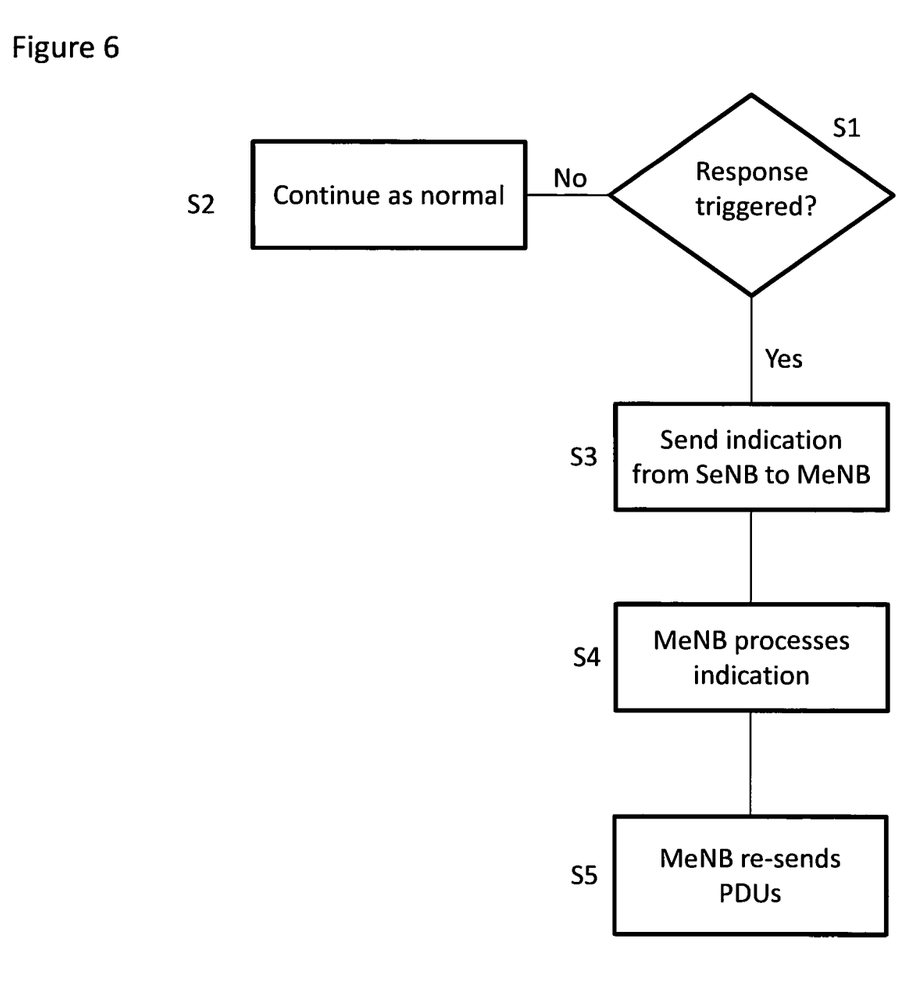
FIG. 6 is a flow chart according to some embodiments.

FIG. 6 is a flowchart showing certain steps according to some embodiments.

At step S1 a determination is made at the SeNB of whether a trigger event has occurred, for example if a timer has elapsed from the last time a PDU was received from the MeNB. If no trigger event has occurred, then the operation continues as normal as shown at step S2.

If, on the other hand, the answer is "yes" i.e. a trigger event has occurred, then the SeNB compiles and sends to the MeNB information comprising an indication of SNs or range of SNs relating to the non-received PDUs.

At step S4 the MeNB processes this information comprising the indication. As discussed above, this processing may comprise comparing the sequence numbers of the non-received PDUs with the sequence numbers of PDUs sent to the SeNB. Where there is a match, the MeNB re-sends the non-received PDUs as necessary, as shown at step S5. The re-sent PDUs may be sent to the SeNB, or may be sent directly to the UE.

This process may be repeated until all PDUs are received.

Figure 7:
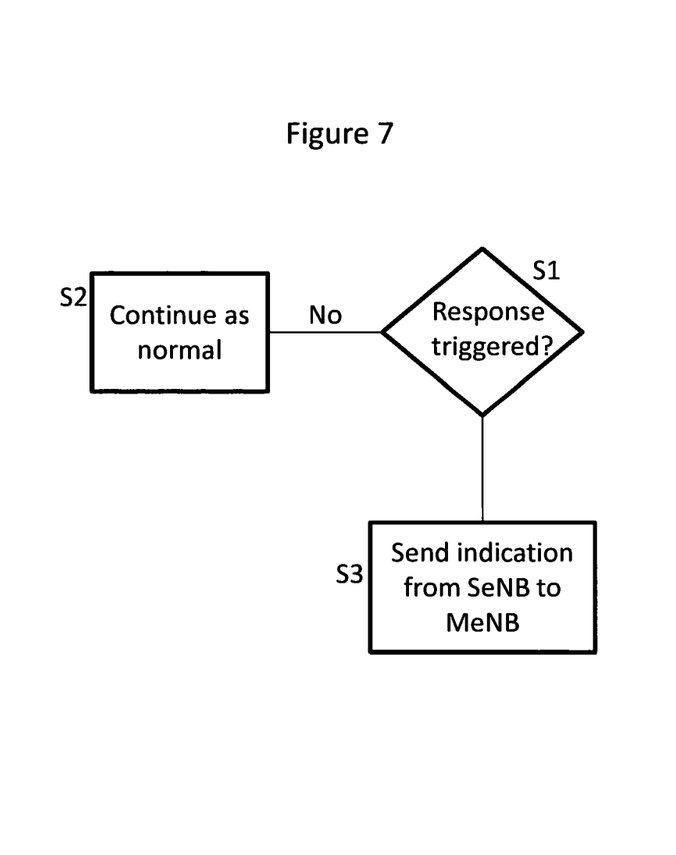
FIG. 7 is a flow chart according to some embodiments.
Figure 8:
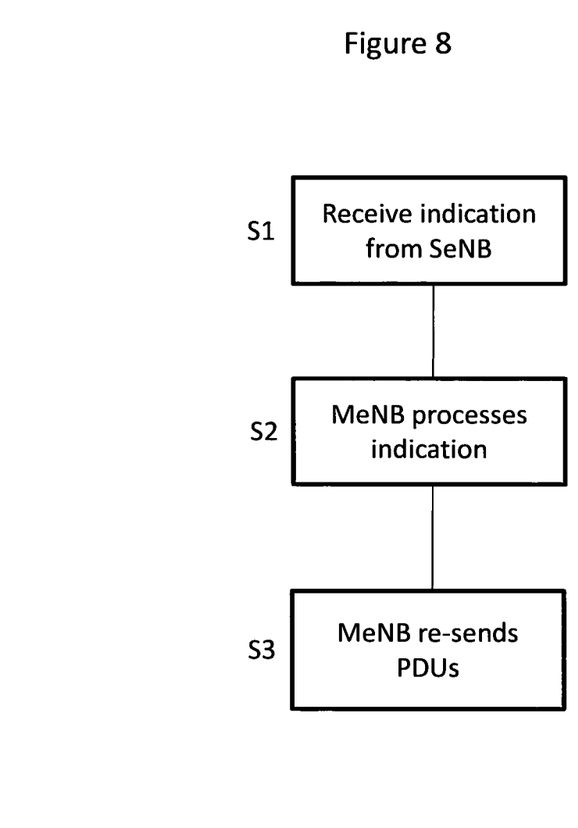
FIG. 8 is a flow chart according to some embodiments.

FIGS. 7 and 8 are flow charts showing the process of FIG. 6, but viewed from separate entities.

The embodiment of FIG. 7 is viewed from the perspective of the SeNB. At step S1 a determination is made at the SeNB of whether a trigger event has occurred, for example if a timer has elapsed from the last time a PDU was received from the MeNB. If no trigger event has occurred, then the operation continues as normal as shown at step S2.

If, on the other hand, the answer is "yes" i.e. a trigger event has occurred, then the SeNB compiles and sends to the MeNB information comprising an indication of SNs or range of SNs relating to the non-received PDUs.

The embodiment of FIG. 8 is viewed from the perspective of the MeNB. At step S1 the MeNB receives an indication of SNs from the SeNB. At step S2 the MeNB processes this information comprising the indication. As discussed above, this processing may comprise comparing the sequence numbers of the non-received PDUs with the sequence numbers of PDUs sent to the SeNB. Where there is a match, the MeNB re-sends the non-received PDUs as necessary, as shown at step S3. The re-sent PDUs may be sent to the SeNB, or may be sent directly to the UE.

In some embodiments the messaging between the nodes (e.g. MeNB and SeNB) takes place according to the X2 AP signalling protocol.

Furthermore in some embodiments, a retransmission decision by the MeNB may lead to direct retransmission by the MeNB to the UE (i.e. without sending it to the SeNB), or a retransmission via SeNB.

Although embodiments have been discussed in terms of non-received PDUs sent from an MeNB and intended for transmission to a user equipment by an SeNB, it will be understood that this is by way of example only and that the principle may apply to other types of nodes or arrangements of nodes. Furthermore the embodiments may operate in any direction e.g. uplink or downlink. For example, although the example described with respect to FIGS. 5 and 6 relate to messages sent on the downlink through the MeNB and via the SeNB to the UE, other embodiments may relate to the reverse operation i.e. on the uplink from the UE to the SeNB and via the MeNB to the network. In such a case the MeNB can indicate to the SeNB SNs of non-received PDUs, and the SeNB can process this information and resend those missing PDUs to the MeNB.

The sequence number range may be continuous e.g. 1, 2, 3, 4 or 7, 8, 9, 10, etc. More than one range may be indicated at the same time. For example the SeNB may provide an indication to the MeNB that data associated with SNs 2 to 7 and 12 to 15 is missing. It will also be understood that the SeNB may not explicitly indicate the extent of the range, and the MeNB may determine the range from the information given. For example the SeNB may provide the MeNB with an endpoint of the range, and the MeNB can determine the extent of the range using further information.

The term "endpoint" may refer to either or both of the lower end of the range and the upper end of the range. In some embodiments the range may have no specific upper endpoint. For example the SeNB may indicate a lower endpoint of "3". The MeNB may infer that no PDUs have been successfully received beyond this endpoint. Similarly in some embodiments the range may have no specific lower endpoint. For example the SeNB may indicate an upper endpoint of "10". The MeNB may infer that no PDUs have been successfully received previous to this endpoint.

In some embodiments the one or more endpoints are considered to be included in the range of non-received PDUs. For example an indicated range of 7 to 10 is inferred to mean that PDUs have not been successfully received for SNs 7, 8, 9 and 10.

In other embodiments the endpoints are not considered to be included in the range of non-received PDUs. For example a range of 7 to 10 is inferred to mean that PDUs have not been successfully received for SNs 8 and 9.

It will of course be appreciated that any values given above (e.g. references to particular sequence numbers and/or ranges) are for the purposes of explanation only and are not to be considered as limiting.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
   sending by a first node a part of a data stream toward a second node and another, different part of the data stream toward a user equipment, wherein said first node comprises a master base station and said second node comprises a secondary base station,
   receiving, at the first node and from the second node, an indication of at least one endpoint of a range of sequence numbers associated with non-received protocol data units that were expected by the second node to be part of the data stream but were not received at the second node,
   using said at least one endpoint to determine said range of sequence numbers associated with the non-received protocol data units, wherein said range is a continuous range;
   comparing said range of sequence numbers with at least one sequence number associated with protocol data units previously sent by said first node toward said second node; and
   in response to the comparison indicating a match between said range of sequence numbers and the at least one sequence number, re-sending by the first node protocol data units associated with the range of sequence numbers,
   wherein the at least one endpoint comprises the sequence number associated with successfully received protocol data units and wherein using said at least one endpoint to determine said range of sequence numbers associated with the non-received protocol data units further comprises using the sequence number associated with successfully received protocol data units to determine multiple sequence numbers after or before the sequence number associated with successfully received data and to use the multiple sequence numbers as the range of sequence numbers associated with the non-received protocol data units.

2. The method as set forth in claim 1, wherein said resending protocol data units further comprises resending the protocol data units to one or more of said second node or said user equipment.

3. The method as set forth in claim 1, wherein said at least one endpoint comprises a sequence number associated with successfully received protocol data units.

4. The method as set forth in claim 3, wherein said at least one endpoint further comprises a sequence number associated with the non-received protocol data units.

5. The method as set forth in claim 4, wherein said at least one endpoint further comprises a sequence number associated with last-received protocol data unit or a sequence number associated with a first-received protocol data unit.

6. The method as set forth in claim 1, wherein said at least one endpoint comprises a sequence number associated with the non-received protocol data units.

7. An apparatus comprising
   at least one processor;
   and at least one memory including computer program code;
   the at least one memory and the computer program code configured to, with the at least one processor, cause the apparatus at least to:
   send by a first node a part of a data stream toward a second node and another, different part of the data stream toward a user equipment, wherein said first node comprises a master base station and said second node comprises a secondary base station,
   receive, at the first node and from the second node, an indication of at least one endpoint of a range of sequence numbers associated with non-received protocol data units that were expected by the second node to be part of the data stream but were not received at the second node;
   use said at least one endpoint to determine said range of sequence numbers associated with the non-received protocol data units, wherein said range is a continuous range;
   compare said range of sequence numbers with at least one sequence number associated with protocol data units previously sent by said first node toward said second node; and
   in response to the comparison indicating a match, re-send by the first node protocol data units associated with the range of sequence numbers,
   wherein the at least one endpoint comprises the sequence number associated with successfully received protocol data units and wherein using said at least one endpoint to determine said range of sequence numbers associated with the non-received protocol data units further comprises using the sequence number associated with successfully received protocol data units to determine multiple sequence numbers after or before the sequence number associated with successfully received data and to use the multiple sequence numbers as the range of sequence numbers associated with the non-received protocol data units.

8. The apparatus as set forth in claim 7, wherein resending protocol data units further comprises resending the protocol data units to one or more of said node or said user equipment.

9. The apparatus as set forth in claim 7, wherein said at least one endpoint comprises a sequence number associated with successfully received protocol data units.

10. The apparatus as set forth in claim 9, wherein said at least one endpoint further comprises a sequence number associated with the non-received protocol data units.

11. The apparatus as set forth in claim 10, wherein said at least one endpoint further comprises a sequence number associated with last-received protocol data unit or a sequence number associated with a first-received protocol data unit.

12. The apparatus as set forth in claim 7, wherein said at least one endpoint comprises a sequence number associated with the non-received protocol data units.

13. A computer program product comprising a non-transitory computer-readable medium having computer executable instructions thereon which when run on one or more processors of an apparatus cause the apparatus to perform at least the following:

sending by a first node a part of a data stream toward a second node and another, different part of the data stream toward a user equipment, wherein said first node comprises a master base station and said second node comprises a secondary base station, receiving, at the first node and from the second node, an indication of at least one endpoint of a range of sequence numbers associated with non-received packet data units that were expected by the second node to be part of the data stream but were not received at the second node, using said at least one endpoint to determine said range of sequence numbers associated with the non-received packet data units, wherein said range is a continuous range;

comparing said range of sequence numbers with at least one sequence number associated with packet data units previously sent by said first node toward said second node; and in response to the comparison indicating a match between said range of sequence numbers and the at least one sequence number, re-sending by the first node packet data units associated with the range of sequence numbers, wherein the at least one endpoint comprises the sequence number associated with successfully received packet data units and wherein using said at least one endpoint to determine said range of sequence numbers associated with the non-received packet data units further comprises using the sequence number associated with successfully received packet data units to determine multiple sequence numbers after or before the sequence number associated with successfully received data and to use the multiple sequence numbers as the range of sequence numbers associated with the non-received packet data units.

14. The computer program product as set forth in claim 13, wherein said resending protocol data units further comprises resending the protocol data units to one or more of said second node or said user equipment.

15. The computer program product as set forth in claim 13, wherein said at least one endpoint comprises a sequence number associated with successfully received protocol data units.

16. The computer program product as set forth in claim 15, wherein said at least one endpoint further comprises a sequence number associated with the non-received protocol data units.

17. The computer program product as set forth in claim 16, wherein said at least one endpoint further comprises a sequence number associated with last-received protocol data unit or a sequence number associated with a first-received protocol data unit.

18. The computer program product as set forth in claim 13, wherein said at least one endpoint comprises a sequence number associated with the non-received protocol data units.

* * * * *